(12) United States Patent
Ben Yaacov et al.

(10) Patent No.: US 11,380,110 B1
(45) Date of Patent: Jul. 5, 2022

(54) THREE DIMENSIONAL TRAFFIC SIGN DETECTION

(71) Applicant: GM GLOBAL TECHNOLOGY OPERATIONS LLC, Detroit, MI (US)

(72) Inventors: Erez Ben Yaacov, Raanana (IL); Elad Plaut, Tel Aviv (IL); Bat El Shlomo, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 88 days.

(21) Appl. No.: 17/125,379

(22) Filed: Dec. 17, 2020

(51) Int. Cl.
| | |
|---|---|
| *G06V 20/58* | (2022.01) |
| *G06T 7/73* | (2017.01) |
| *G06N 3/02* | (2006.01) |
| *B60W 40/04* | (2006.01) |
| *B60W 60/00* | (2020.01) |
| *G06V 20/64* | (2022.01) |

(52) U.S. Cl.
CPC ........... *G06V 20/582* (2022.01); *B60W 40/04* (2013.01); *B60W 60/001* (2020.02); *G06N 3/02* (2013.01); *G06T 7/74* (2017.01); *G06V 20/647* (2022.01); *B60W 2555/60* (2020.02); *G06T 2207/20084* (2013.01); *G06T 2207/30252* (2013.01); *G06T 2210/12* (2013.01)

(58) Field of Classification Search
CPC ...... G06V 10/82; G06V 20/58; G06V 20/582; G06V 20/588; G06V 20/647; G06N 3/08; G06N 3/0454; G06N 20/00; G06N 3/02; G06T 2207/20084; G06T 17/00; G06T 2207/20081; G06T 3/4046; G06T 7/73; G06T 19/00; G06T 2207/30256; G06T 2207/30236; G06T 7/74; G06T 2207/30252; G06T 2210/12; B60W 40/04; B60W 60/001; B60W 2555/60
See application file for complete search history.

(56) References Cited

U.S. PATENT DOCUMENTS

| | | | | |
|---|---|---|---|---|
| 9,418,303 | B2 * | 8/2016 | Zobel | G06V 10/32 |
| 9,767,371 | B2 * | 9/2017 | Ai | G01S 17/42 |
| 10,474,912 | B2 * | 11/2019 | Saeki | B60K 35/00 |
| 10,670,416 | B2 * | 6/2020 | Wheeler | G05D 1/0088 |

(Continued)

OTHER PUBLICATIONS

Simultaneous Traffic Sign Detection and Boundary Estimation Using Convolutional Neural Network (Year: 2018).*

(Continued)

*Primary Examiner* — Nizar N Sivji
(74) *Attorney, Agent, or Firm* — Lorenz & Kopf LLP

(57) ABSTRACT

Vehicles and methods for detecting a three-dimensional (3D) position of a traffic sign and controlling a feature of the vehicle based on the 3D position of the traffic sign. An image is received from a camera. The image is processed using a neural network. The neural network includes a traffic sign class block regressing a traffic sign class for a traffic sign included in the image and a rotation block regressing an orientation for the traffic sign. Dimensions for the traffic sign are retrieved from an information database based on the traffic sign class. A 3D position of the traffic sign is determined based on the dimensions of the traffic sign and the orientation of the traffic sign. A feature of the vehicle is controlled based on the 3D position of the traffic sign.

18 Claims, 4 Drawing Sheets

(56) References Cited

U.S. PATENT DOCUMENTS

| | | | |
|---|---|---|---|
| 2011/0216202 A1* | 9/2011 | Natroshvili | G06V 20/582 |
| | | | 382/104 |
| 2017/0364759 A1* | 12/2017 | Creusot | G08G 1/0955 |
| 2020/0192398 A1* | 6/2020 | Xu | G06K 9/6263 |

OTHER PUBLICATIONS

Deep Learning Based Traffic Signs Boundary Estimation (Year: 2020).*

* cited by examiner

THREE DIMENSIONAL TRAFFIC SIGN DETECTION

INTRODUCTION

The technical field generally relates to vehicles, and more particularly relates to methods and systems for detecting a traffic sign for use in vehicular applications.

Vehicles utilize traffic sign detection in a variety of vehicle control applications including advanced driver assistance systems (ADAS) and autonomous driving tasks as two of many possible examples. Such vehicle control applications may require objects to be detected and tracked using a sensing system in order to control emergency braking, collision avoidance, path planning, and other automatic vehicle control functions.

Object detection in vehicles may be performed using a computer vision system. The object detection task may include predicting physical dimensions (width, height and length) of the object and the pose of the object in six dimensions (6D), namely the three dimensional (3D) position of the object (such as a center point of the object) and rotation angles around the three axes.

Among the various objects in road scenes, traffic signs have unique properties and offer particular challenges to detection, size determination and localization using computer vision processing. Unlike other objects, they are mounted on poles and thus do not touch the ground. Traffic signs are planar objects, and the exact appearance of each traffic sign is dictated by government regulations. Traffic signs of the same class exist in several different sizes and are often identical in all other aspects. Traffic signs are also some of the smallest objects of interest. The detection of traffic sign objects is useful if identified as a traffic sign class, if the type of traffic sign class is identified and if the traffic sign position in 3D is identified. There are often hundreds of possible traffic sign types (e.g. Stop, Yield, No U-Turn, etc.) that are difficult to distinguish from one another.

Accordingly, it is desirable to provide systems and methods for detecting traffic signs in at least 3D spatial coordinates and optionally also including 3D rotation coordinates. The systems and methods may detect the traffic sign using computer vision processing of a camera image, which may be a monocular image. Furthermore, other desirable features and characteristics of the present invention will become apparent from the subsequent detailed description and the appended claims, taken in conjunction with the accompanying drawings and the foregoing technical field and background.

SUMMARY

A method of detecting a 3D position of a traffic sign and controlling a feature of the vehicle based on the 3D position of the traffic sign. The method, which is implemented by a processor, includes receiving an image from a camera and processing the image using a neural network. The neural network includes a traffic sign class block regressing a traffic sign class for a traffic sign included in the image and a rotation block regressing an orientation for the traffic sign. Dimensions for the traffic sign are retrieved from a traffic sign information database based on the traffic sign class. A 3D position of the traffic sign is determined based on the dimensions of the traffic sign and the orientation of the traffic sign. A feature of the vehicle is controlled based on the 3D position of the traffic sign.

In embodiments, the neural network includes backbone and 2D box blocks that regress location and dimensions of a two dimensional (2D) bounding box around the traffic sign.

In embodiments, the neural network includes a pooling layer that pools features from a feature map output from the backbone block based on the location and dimensions 2D bounding box.

In embodiments, the method include calculating azimuth and elevation angle data, or functions thereof, for the traffic sign based on a location of the 2D bounding box in image coordinates and intrinsic parameters of the camera for use by the rotation block in regressing the orientation for the traffic sign. In embodiments, the method includes calculating the azimuth and elevation angle data, or functions thereof, for the traffic sign based on a location of the 2D bounding box in image coordinates and intrinsic parameters of the camera and concatenating the azimuth and elevation angle data with the pooled features for input to the rotation block.

In embodiments, the neural network regresses location and dimensions of a two-dimensional (2D) bounding box around the traffic sign in image coordinates and azimuth and elevation angles are calculated based on the location of the 2D bounding box. The method includes solving for Z one or more equations based on position and dimensions of the 2D bounding box, the orientation and dimensions of the traffic sign, the azimuth and elevation angles and intrinsic parameters of the camera. Z is a forward distance from the camera to the traffic sign in camera coordinates.

In embodiments, the one or more equations define a camera projection onto a camera image plane based on the orientation and dimensions of the traffic sign and the azimuth and elevation angles. The one or more equations constrain a projected 2D bounding box to be consistent with the 2D bounding box regressed by the neural network.

In embodiments, the method includes solving X and Y positions of the traffic sign based on a camera model, the location and dimensions of the 2D bounding box, the camera intrinsic parameters and Z, wherein X, Y and Z make up the 3D position of the traffic sign in camera coordinates.

In embodiments, the camera is a monocular camera.

In embodiments, the regressed orientation for the traffic sign is a global orientation and not an allocentric orientation.

In embodiments, the traffic sign class block is a classifier.

In embodiments, the method includes detecting contextual data for the traffic sign and retrieving dimensions for the traffic sign based on the traffic sign class and the contextual data. In embodiments, the contextual data is road type or speed limit data.

In embodiments, the contextual data is detected based on mapping information or computer vision processing.

In embodiments, the controlling the feature of the vehicle includes controlling an autonomous driving system, localizing the vehicle in a map, or controlling an advanced driver assistance system feature.

In another aspect, a vehicle is provided. The vehicle includes a camera and a processor configured to execute program instructions. The program instructions are configured to cause the processor to perform steps as follows: receive an image from a camera, process the image using a neural network, wherein the neural network includes a traffic sign class block regressing a traffic sign class for a traffic sign included in the image and a rotation block regressing an orientation for the traffic sign, retrieve, from a traffic sign information database, dimensions for the traffic sign based on the traffic sign class, determine a three-dimensional (3D) position of the traffic sign based on the dimensions of the traffic sign and the orientation of the traffic sign, and control a feature of the vehicle based on the 3D position of the traffic sign.

In embodiments, the neural network includes backbone and 2D box blocks that regress location and dimensions of a two dimensional (2D) bounding box around the traffic sign.

In embodiments, the program instructions are configured to cause the processor to calculate azimuth and elevation angle data, or functions thereof, for the traffic sign based on a location of the 2D bounding box in image coordinates and intrinsic parameters of the camera for use by the rotation block in regressing the orientation for the traffic sign.

In embodiments, the neural network regresses location and dimensions of a two-dimensional (2D) bounding box around the traffic sign in image coordinates, azimuth and elevation angles are calculated based on the location of the 2D bounding box, and one or more equations are solved for Z based on position and dimensions of the 2D bounding box, the orientation and dimensions of the traffic sign, the azimuth and elevation angles and intrinsic parameters of the camera. Z is a forward distance from the camera to the traffic sign in camera coordinates.

In embodiments, controlling the feature of the vehicle includes controlling an autonomous driving system, localizing the vehicle in a map, or controlling an advanced driver assistance system feature.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
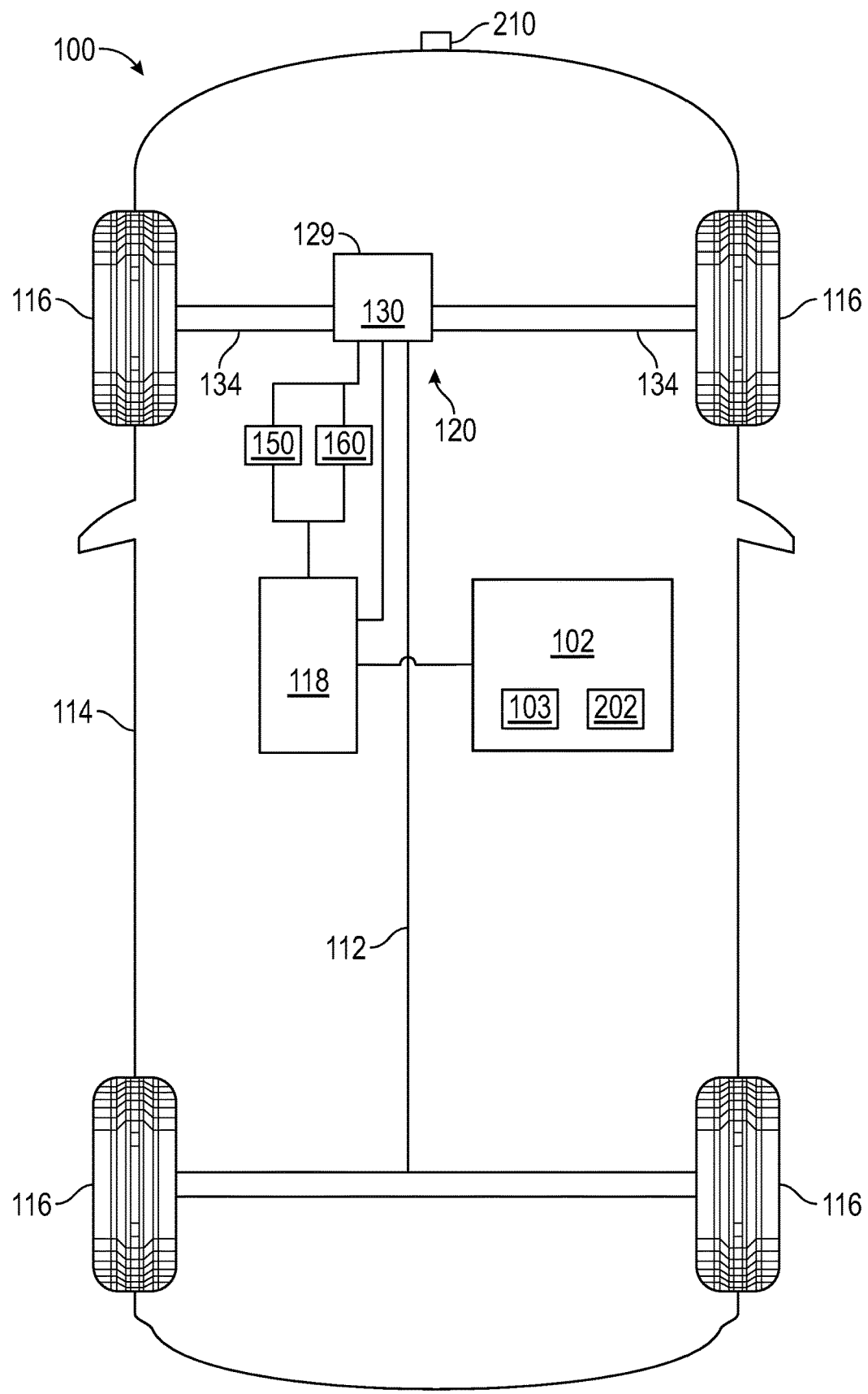
FIG. 1 is a functional block diagram of a vehicle that includes a control system having traffic sign detection functionality, in accordance with an exemplary embodiment.

FIG. 1 illustrates a vehicle 100, or automobile, according to an exemplary embodiment. As described in greater detail further below, the vehicle 100 includes a control system 102 including a neural network architecture that outputs 3D position for each traffic sign in a camera image based on retrieving standardized dimensions for the traffic sign. A neural network detects traffic signs from the image from, for example, a single (monocular) camera including a 3D position and orientation for each traffic sign. In one example, the neural network regresses a 2D bounding box, optionally a confidence score, a traffic sign type, and a global orientation (e.g. roll, pitch, yaw). A global orientation of the traffic signs is estimated using the neural network. A unique traffic sign type is predicted and is used to infer the 3D dimensions for the traffic sign based on the fact that traffic sign size for any given traffic sign type is known beforehand and retrievable from a database. One or more possible 3D positions of the traffic sign are computed using 3D plane geometry, the global orientation, the 2D bounding box and the 3D dimensions for the traffic sign.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments, the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. The actuator assembly further includes a steering system 150 and a braking system 160 and associated steering and braking actuators. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 100, in certain embodiments the vehicle 100 may not include a steering wheel and/or steering column. In addition, in certain embodiments, an autonomous vehicle may utilize steering commands that are generated by a computer, with no involvement from the driver.

The braking system 160 is mounted on the chassis 112 and provides braking for the vehicle 100. The braking system 160 receives inputs from the driver via a brake pedal (not depicted) and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver (in one such embodiment, a computer of the vehicle may use input from the radar system to steer, brake, and/or accelerate the vehicle).

Referring back to the exemplary embodiment of FIG. 1, the vehicle 100 includes one or more cameras 210 as part of a computer vision system. The one or more cameras 210 can include a dashcam or an external forward-looking camera. The camera may be a wide angled camera capable of viewing 130°, 170° or more of a forward scene. The camera may be a monocular camera and may provide at least RGB (Red, Green, Blue) video (made up of frames of image data) or image data.

The control system 102 is mounted on the chassis 112. The control system 102 provides for traffic sign detection by using a neural network to determine a traffic sign class, a 2D bounding box for the traffic sign and a traffic sign orientation. Dimensions of the traffic sign can be retrieved from a database of traffic sign information based on the traffic sign class. The orientation of the traffic sign is used in combination with camera intrinsic parameters to project the dimensions of the traffic sign onto an image plane of the camera 210 and, based on the projection, a solution for a Z position for the traffic sign can be found using constraints of the dimensions of the 2D bounding box regressed by the neural network. From the Z position (a forward direction in camera coordinates), X and Y positions for the traffic sign can be determined based additionally on a camera model and the position of the 2D bounding box from the neural network. The control system 102, in one example, provides these functions in accordance with the method 400 described further below in connection with FIG. 4 and the associated data transformations of FIG. 3.

Figure 2:
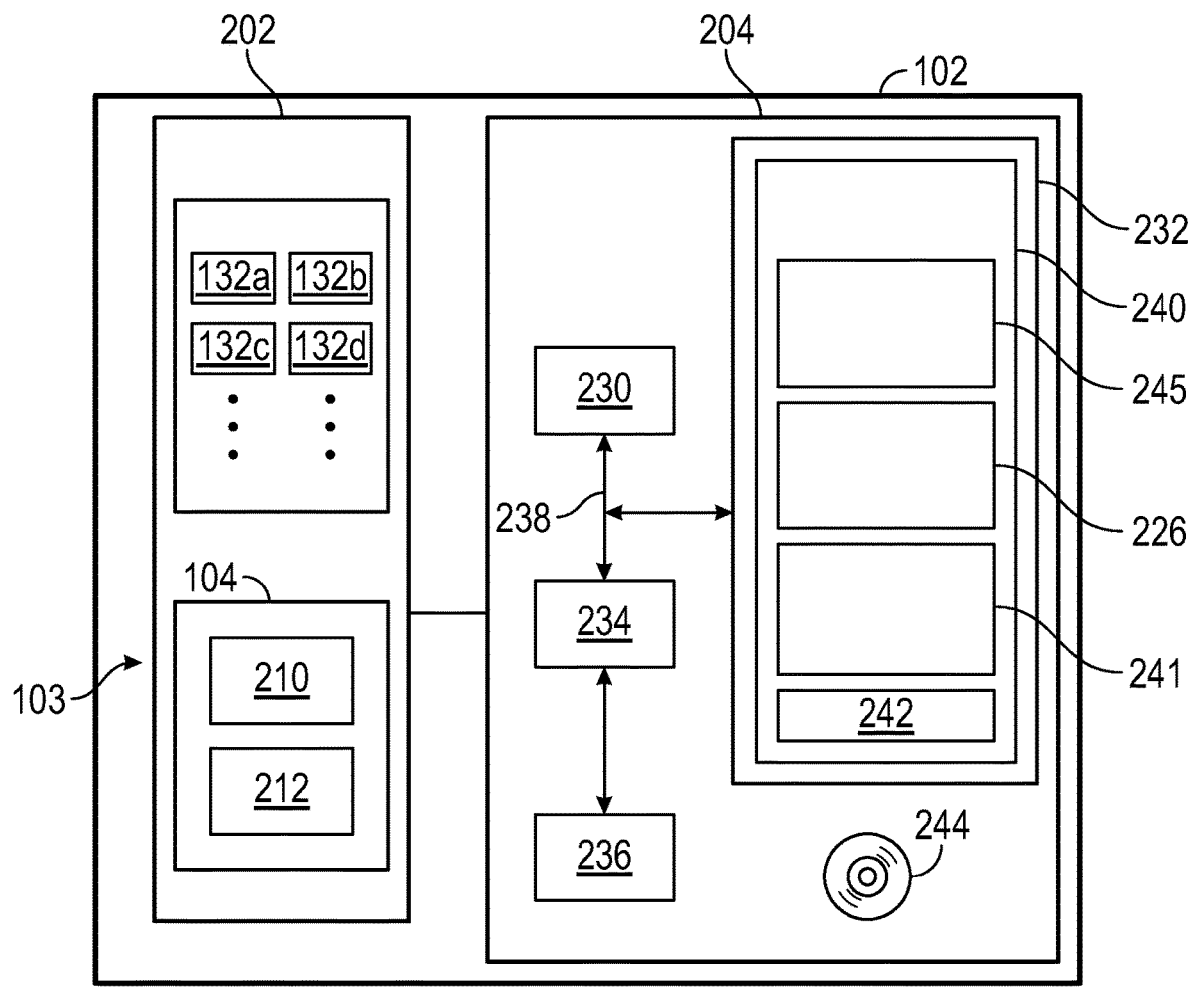
FIG. 2 is a functional block diagram of the control system of the vehicle of FIG. 1, in accordance with an exemplary embodiment.

With reference to FIG. 2, a functional block diagram is provided for the control system 102 of FIG. 1, in accordance with an exemplary embodiment. As depicted in FIG. 2, the control system 102 includes the radar system 202, additional sensors 104 including the camera 210 and a controller 204. The camera 210 is included as part of the computer vision system 103. In the depicted embodiment, the sensors 104 include the one or more cameras 210 and one or more light detection and ranging (LIDAR) systems. The computer vision system 103 obtains respective sensor information identifying objects on or near a road in which the vehicle 100 is travelling, such as moving or stationary vehicles on or alongside the road, pedestrians, bicyclists, animals, buildings, trees, guard rails, medians, and/or other objects on or alongside the road. The computer vision system 103 is configured to obtain camera images and to process the camera image to identify type and 6D pose of traffic signs, which includes 3D location and 3D orientation information.

As depicted in FIG. 2, the controller 204 is coupled to the camera 210. In certain embodiments, the controller 204 is coupled to one or more other vehicle systems (such as the electronic control system 118 of FIG. 1). The controller 204 receives the information sensed or determined from the camera 210, performs object detection including traffic sign type and position detection and controls one or more features of the vehicle 100 based on the traffic sign information.

As depicted in FIG. 2, the controller 204 comprises a computer system. In certain embodiments, the controller 204 may also include the camera 210 and/or components thereof. In addition, it will be appreciated that the controller 204 may otherwise differ from the embodiment depicted in FIG. 2. For example, the controller 204 may be coupled to or may otherwise utilize one or more remote computer systems and/or other control systems, such as the electronic control system 118 of FIG. 1.

In the depicted embodiment, the computer system of the controller 204 includes a processor 230, a memory 232, an interface 234, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the processes described herein, such as the method 400 described further below in connection with FIG. 4 and the data flow processes of FIG. 3. The one or more programs 240 include a neural network module 245, a traffic sign dimensions module 226 and a traffic sign position module 241 for performing steps of method 400 described in detail below.

The processor 230 is capable of executing one or more programs (i.e., running software) to perform various tasks encoded in the program(s), particularly the neural network module 245, the traffic sign dimensions module 226 and a traffic sign position module 241. The processor 230 may be a microprocessor, microcontroller, application specific integrated circuit (ASIC) or other suitable device as realized by those skilled in the art.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 204. The interface 234 allows communication to the computer system of the controller 204, for example from a system driver and/or another computer system, and can be implemented using any suitable method and apparatus. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 (including computer modules 226, 241 and 245) that executes one or more embodiments of one or more processes of the present disclosure, such as the steps of the method 400 (and any sub-processes thereof). In another exemplary embodiment, the program product may be directly stored in and/or otherwise accessed by the memory 232 and/or a disk (e.g., disk 244), such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
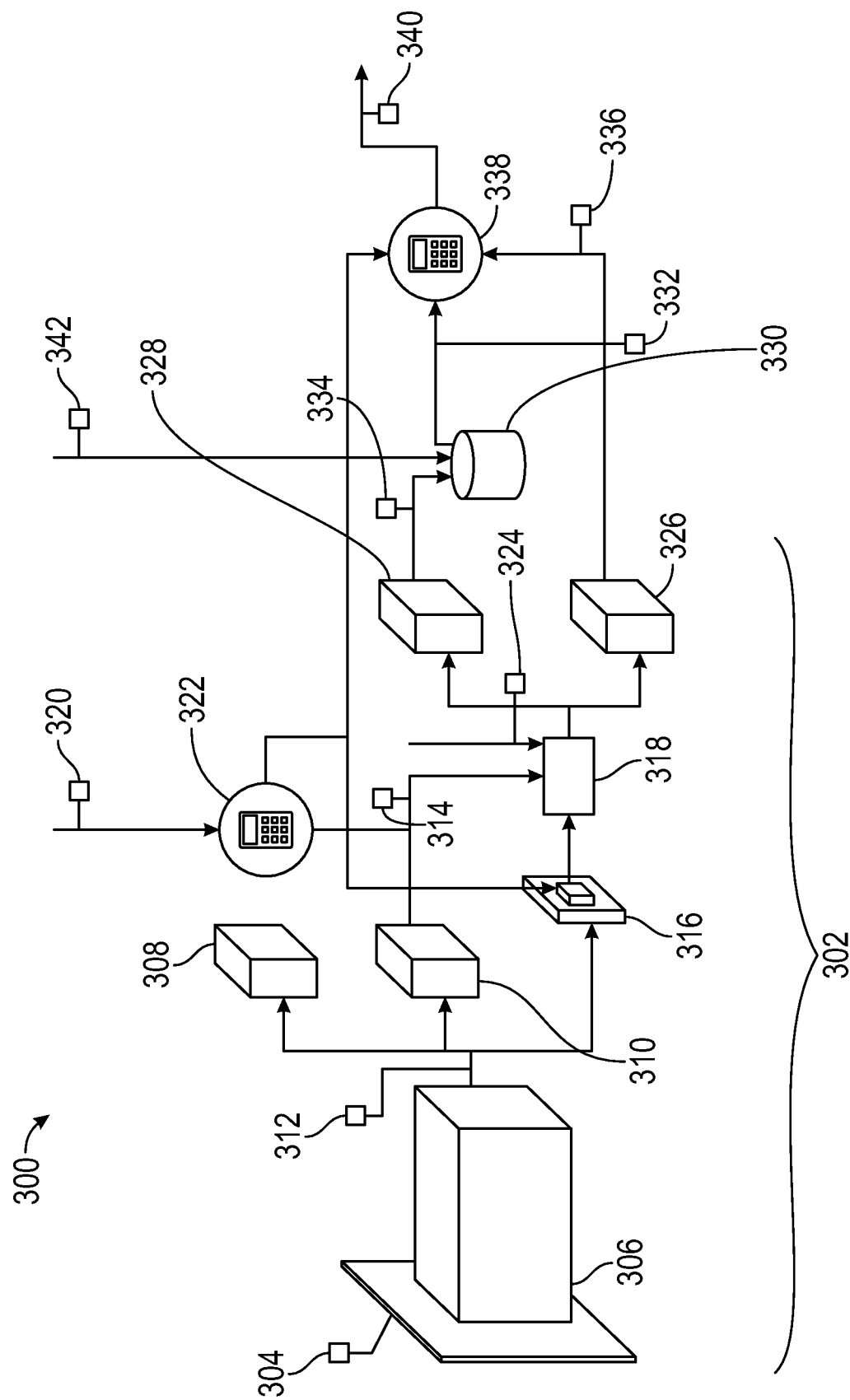
FIG. 3 is a data flow diagram for traffic sign detection and three-dimensional (3D) localization, which is performed by the vehicle of FIG. 1 and the control system of FIG. 2, in accordance with an exemplary embodiment.

With additional reference to the data flow diagram 300 of FIG. 3, the neural network module 245 is implemented by a neural network 302 including neural network blocks including a backbone block 306, a confidence block 308, a 2D box block 310, a pooling layer 316, a rotation block 326 and a traffic sign class block 328. The neural network 302 receives and processes image data 304 in order to regress 2D bounding box data 314 describing a 2D bounding box around each detected traffic sign, traffic sign class data 334 identifying a traffic sign type for each detected traffic sign, traffic sign orientation data 336 describing a rotational pose of each detected traffic sign and azimuth and elevation data 324 describing azimuth and elevation angles from the camera image plane to the object. The traffic sign dimensions module 226 interrogates a traffic sign information database 330 so as to retrieve real world dimensions for each detected traffic sign based on the traffic sign class data 334 and thus to output traffic sign dimensions data 332. The traffic sign position module 241 implements a traffic sign position calculator 338 that solves one or more equations for a Z position of the traffic sign in camera coordinates. The one or more equations project the dimensions of each traffic sign (as defined in the traffic sign dimensions data 332) into an image plane of the camera 210 adjusted for rotational pose of the traffic sign (as defined in the traffic sign orientation data 336) when the size of the projected traffic sign is constrained by the dimensions of the 2D bounding box (defined in the 2D bounding box data) and taking into account azimuth and elevation angles of the traffic sign (as defined in the azimuth and elevation data 324). The traffic sign position calculator 338 derives X and Y positions of the traffic sign in camera coordinates based on a camera model, the Z position of the traffic sign and the locations of the 2D bounding box in image space. As such, the control system 102 determines, based on an input image, 3D rotational pose (as defined in the traffic sign orientation data 336) and 3D spatial pose (X, Y and Z positions provided in traffic sign position data 340). This information can be used by the control system 102 to control ADAS features, autonomous features or can be used in mapping localization operations, for example. In one embodiment, the 6D pose information for each traffic sign is used in determining actuator commands for the actuators 120 including at least one of the steering system 150, the braking system 160 and the engine 130.

The calculations and mathematical basis for the blocks and calculators of the data flow diagram 300 of FIG. 3 will be described in the following, in accordance with an exemplary embodiment. In camera coordinates, X is left/right, Y is up/down and Z is forward (along a central optical axis of the camera 210). In one camera model, perspective images obey the pinhole camera model and a 3D point in camera coordinates [X, Y, Z] is projected onto the image by multiplication with a camera intrinsic matrix:

$$\begin{bmatrix} x \\ y \\ 1 \end{bmatrix} = \begin{bmatrix} f_X & 0 & c_x \\ 0 & f_Y & c_y \\ 0 & 0 & 1 \end{bmatrix} \begin{bmatrix} X \\ Y \\ Z \end{bmatrix}. \qquad \text{(equation 1)}$$

In equation 1, $f_X$, $f_Y$ are the focal lengths along the X, Y axes, $c_x$, $c_y$ represent the principal point and x, y are the coordinates of the projected point on the image. A 3D object facing the camera 210 with width $\Delta X=W$ and height $\Delta Y=H$ has a magnification proportional to Z. A size of a 2D box enclosing the projected object on a camera image is:

$$w = \frac{f_X W}{Z}, \text{ and} \qquad \text{(equation 2)}$$

$$h = \frac{f_Y H}{Z}. \qquad \text{(equation 3)}$$

In equations 2 and 3, $w=\Delta x$ and $h=\Delta y$.

Traffic signs of the same type/class exist in several different sizes that otherwise have the same appearance. For instance, the size of speed limit signs in the United States (W×H in inches) is 24×30 on single lane conventional roads and 48×60 on freeways. Therefore, a speed limit sign on a single-lane road appears in an image exactly like a speed limit sign on a freeway if it is twice as distant. In some European countries, the traffic sign dimensions are determined by the speed limit of the road. Different countries have different regulations as regards size of traffic signs. By equations 2 and 3, the same traffic sign having different dimensions presents a problem that is ill posed in W, H, which is also a problem ill posed in Z.

Rotations around the X, Y, Z axes are referred to as pitch, yaw and roll, respectively, and are denoted by α, β, γ. Objects with the same global rotation change their appearance as a function of their location within the image, which may be described using the azimuth φ and elevation ψ to the object. Allocentric observation angles α-ψ, β-φ can be contrasted with global rotation of the object α, β, γ. An assumption of the preservation of appearance as a function of the allocentric rotation is invalid for flat objects such as traffic signs. As such, the rotation block 326 directly regresses the global orientation α, β, γ rather than regressing the allocentric rotation and deriving the global orientation therefrom, as will be described further below.

The perspective projection of flat objects such as traffic signs depends on the orientation of the object α, β and on the azimuth and elevation angles of the object ψ, φ separately. In the exemplary embodiment of FIG. 3, the azimuth and elevation angles, or functions thereof, are injected into the rotation block 326 of the neural network 302 to allow prediction of the global rotation α, β, γ of the object (namely, a traffic sign).

In accordance with the exemplary embodiment of FIG. 3, the backbone block 306 receives the image data 304 from the camera 210. The image data 304 may be grayscale or color image data. For example, the image data 304 may be RGB (Red, Green and Blue) image data. The image data 304 may be a single image from a forward scene relative to the vehicle 100 and may be provided as part of video image data. However, the data flows of FIG. 3 are capable of operating on a single image at a time. In one embodiment, the image data 304 is received from a monocular camera 210. In embodiments, the backbone block 306 includes convolutional layers that process the image data 304 to provide a traffic sign classification (e.g. a binary classification) that indicates whether the image data includes a traffic sign (but not the type of traffic sign). The backbone block 306 outputs features maps in the form of the feature map data 312 that are supplied to the 2D box block 310 that uses convolutional layers to regress coordinates in image space for a 2D bounding box around each traffic sign identified in the image data 304. Thus, the combination of the backbone block 306 and the 2D box block are trained to detect traffic signs in the image data 304 and to output 2D bounding box dimensions and coordinates for each traffic sign. The bounding box data 314 may be provided as minimum and maximum x and y coordinates in image space, box dimensions and box center x and y coordinates in image space, box corner x and y coordinates in image space, etc. In one embodiment, the backbone block 306 is a Feature Pyramid Network (FPN), which may output a pyramid of feature maps as the feature map data 312, with each feature map being at a different spatial resolution/scale. The backbone block 306 may be provided as a combination of the FPN and a ResNet18 based encoder suitable for detecting small objects such as traffic signs.

In embodiments, the bounding box data from the 2D box block 310 is used by a pooling layer 316 to pool features from the backbone block 306. That is, the feature map layer in the most proper scale (based on the size of the region of interest defined by the bounding box data 314) is extracted by the pooling layer 316 as feature patches corresponding to the 2D bounding box identified in the bounding box data 314.

In accordance with the data flow diagram of FIG. 3, an azimuth and elevation data calculator 322 is included, which determines the azimuth and elevation angles, or functions thereof, for each identified 2D bounding box based on the 2D bounding box data 314. Specifically, the following equations are used to determine cos and sin functions of the azimuth angle:

$$\sin \varphi = \frac{f_X}{\sqrt{f_X^2 + (x_0 - c_x)^2}} \quad \text{(equation 4)}$$

$$\cos \varphi = \frac{x_0 - c_x}{\sqrt{f_X^2 + (x_0 - c_x)^2}} \quad \text{(equation 5)}$$

The vertical (y axis) equivalents of equations 4 and 5 are used to calculate sin ψ and cos ψ based on $y_o$, $f_Y$ and $c_y$. In these equations $x_o$, $y_o$ represent a location of the 2D bounding box in image space and may be a center point of the 2D bounding box derived from the 2D bounding box data 314 or some other single reference point such as a bottom left or top right corner point. The camera intrinsic parameters $f_X$, $c_x$, $f_Y$ and $c_y$ are known parameters of the camera 210 and are provided as reference data in the form of camera intrinsic parameters 320 in the data flow diagram 300. The combination of sin φ, cos φ, sin ψ and cos ψ or the azimuth and elevation angles themselves φ, ψ are output as azimuth and elevation data 324.

In the exemplary embodiment of FIG. 3, the neural network 302 includes a concatenation block 318 that adds the azimuth and elevation data 324 to the pooled feature map from the pooling layer 316 and the combination of features are input to the second stage of the neural network 302 defined by the traffic sign class block 328 and the rotation block 326. As traffic signs are flat objects, their appearance is not preserved for a constant allocentric rotation, so the additional input features cos φ, sin φ, cos ψ, sin ψ are significant additional parameters for predicting the orientation of traffic signs. Further, these additional features support direct regression of global rotation (pitch, yaw and roll) of the traffic sign by the rotation block 326 rather than allocentric rotation.

The traffic sign class block 328 and the rotation block 326 receive the feature maps from the pooling layer 316 corresponding to the limited region of the 2D box around each traffic sign. The rotation block 326 additionally receives the concatenated azimuth and elevation data 324. The traffic sign class block 328 and the rotation block 326 are parts of the neural network 302, sometimes referred to as subnetworks or network heads, and each one of them includes one or more neural-network layers such as fully-connected layers. The rotation block 326 and the traffic sign class block 328 are classifiers for respectively regressing one of potentially hundreds of traffic signs in the form of traffic sign class data 334 and one or more of pitch, yaw and roll (α, β, γ) of each traffic sign in global coordinates. In some embodiments, only yaw (β) is extracted by the rotation block 326. The traffic sign class block 328 regresses traffic sign class data 334 identifying the traffic sign type from numerous possible types. The rotation block 326 outputs traffic sign orientation data 336 identifying the global rotation of the traffic sign.

The traffic sign dimensions module 226 (not shown in FIG. 3) receives road type data 342 identifying a road type or speed limit of the road on which the vehicle 100 is travelling. Road type data 342 may be supplied by one of a variety of modules of the controller 204. For example, a mapping application may retrieve the road type or speed limit from a map feature based on the vehicle location. In another example, the computer vision system 103 may detect the road type or speed limit by analyzing camera images (e.g. by reading speed limit signs or detecting a number of lanes of a road). The traffic sign dimensions module 226 further receives the traffic sign class data 334 identifying a particular type of traffic sign (e.g. speed limit sign, stop sign, no U-turn sign, gradient sign, no overtaking sign, one-way traffic sign, etc.). The traffic sign information database 330 includes records associating regulated dimensions W, H with each traffic sign class and associating the regulated dimensions with the road type. The traffic sign dimensions module 226 is thus able to retrieve dimensions W, H for each identified traffic sign based on the traffic sign class data and based on the road type data 342. In other embodiments, the road type data 342 is not used. Instead, the traffic sign dimensions module 226 outputs each of the traffic sign dimensions associated with a particular traffic sign class from the traffic sign information database 330. For each detected traffic sign, after predicting the traffic sign type and optionally the road type/speed limit, its dimensions are read from the traffic sign information database 330.

In the exemplary data flow diagram 300 of FIG. 3, the traffic sign orientation data 336 and the traffic sign dimensions data 332 are provided to the traffic sign position calculator 338. Since Z is ill posed as described previously, the neural network 302 does not directly regress Z. Instead, Z is computed analytically by the traffic sign position calculator 338 after the traffic sign dimensions W, H have been resolved by the traffic sign dimensions module 226. The traffic sign position calculator uses 3D plane geometry, the camera intrinsic calibration (described by camera intrinsic parameters 320), the predicted yaw and pitch ($\alpha$, $\beta$ as defined by the traffic sign orientation data) and optionally also roll ($\gamma$), azimuth and elevation angles ($\psi$, $\varphi$ as derived from the azimuth and elevation data 324) and the traffic sign real world dimensions (W, H as defined in the traffic sign dimensions data 332). In the following equations, it has been assumed that $\alpha=\gamma=0$, which is almost always true for traffic signs. Based on an analysis of a 3D perspective projection for the dimension of the traffic sign and the corresponding dimensions in the camera image plane, the following equations have been derived:

When solving from w, Z can be calculated by:

$$Z = \frac{f_X W}{2w} (\sin\beta \tan\varphi + \cos\beta) + \frac{f_X W}{2h} \sqrt{(\sin\beta \tan\varphi + \cos\beta)^2 + \left(\frac{w}{f_X}\sin\beta\right)^2} \quad \text{(equation 6)}$$

When solving from h, Z can be calculated by:

$$Z = \frac{f_Y}{2h} (H + W\sin|\beta| \tan|\psi|) + \frac{f_Y}{2h} \sqrt{(H + W\sin|\beta| \tan|\psi|)^2 + \left(\frac{h}{f_Y}W\sin\beta\right)^2}, \quad \text{(equation 7)}$$

under the condition that:

$$|y_o - c_y| \geq \frac{f_Y hH}{2f_Y H + hW \sin|\beta|}, \text{ otherwise the solution is:} \quad \text{(equation 8)}$$

$$Z = \frac{f_Y}{h}H + \frac{1}{2}W\sin\beta. \quad \text{(equation 9)}$$

In equations 6 to 9, only the regressed yaw of traffic sign orientation data 336 is used. However, other derivations are possible in which less assumptions are made that would make use of pitch and possibly also roll as inputs, although this would increase the complexity of the calculations required. Equations 6 to 9 have been derived based on a camera projection being used to project the corners of a traffic sign with known orientation (traffic sign orientation data 336) and dimensions (traffic sign dimensions data 332) and unknown position onto the image. The position on the camera image is extracted from one or more equations 6 to 9, which implicitly constrain the 2D bounding box enclosing the projected corners to be consistent with the 2D bounding box predicted by the neural network 302 as part of the bounding box data 314.

The traffic sign position calculator 338 may compute separate predictions for Z, one from equation 6 and one from either equation 7 or equation 9 or just one prediction may be derived based on either equation 6 or based on equation 7 or equation 9. When two predictions for Z are calculated, these may be combined by averaging or some other function such as a function selecting the most reasonable prediction, e.g. based on a sliding window of historical predictions. In some embodiments, when the road type data 342 is not used to uniquely identify one set of traffic dimensions and a plurality of proposals are output from the traffic sign dimensions module 226 that are each processed by the traffic sign position calculator 338, then a plurality of Z predictions may be output, one or more for each input set of traffic sign dimensions. In this case, a function may be used to select the most reasonable prediction based on consistency with a sliding window including one or more most recent historical Z predictions.

The traffic sign position calculator 338 further determines X and Y real world positions for the traffic sign based on the predicted Z and using equation 1, which represents a camera model and factors in camera intrinsic parameters 320. In this way, traffic sign position data 340 is output, which can include 3D X, Y and Z spatial positions for each identified traffic sign and optionally also 3D rotational pose information based on the traffic sign orientation data 336. The traffic sign position data 340 is utilized by one or more vehicle control applications of the control system 102 as described above.

Figure 4:
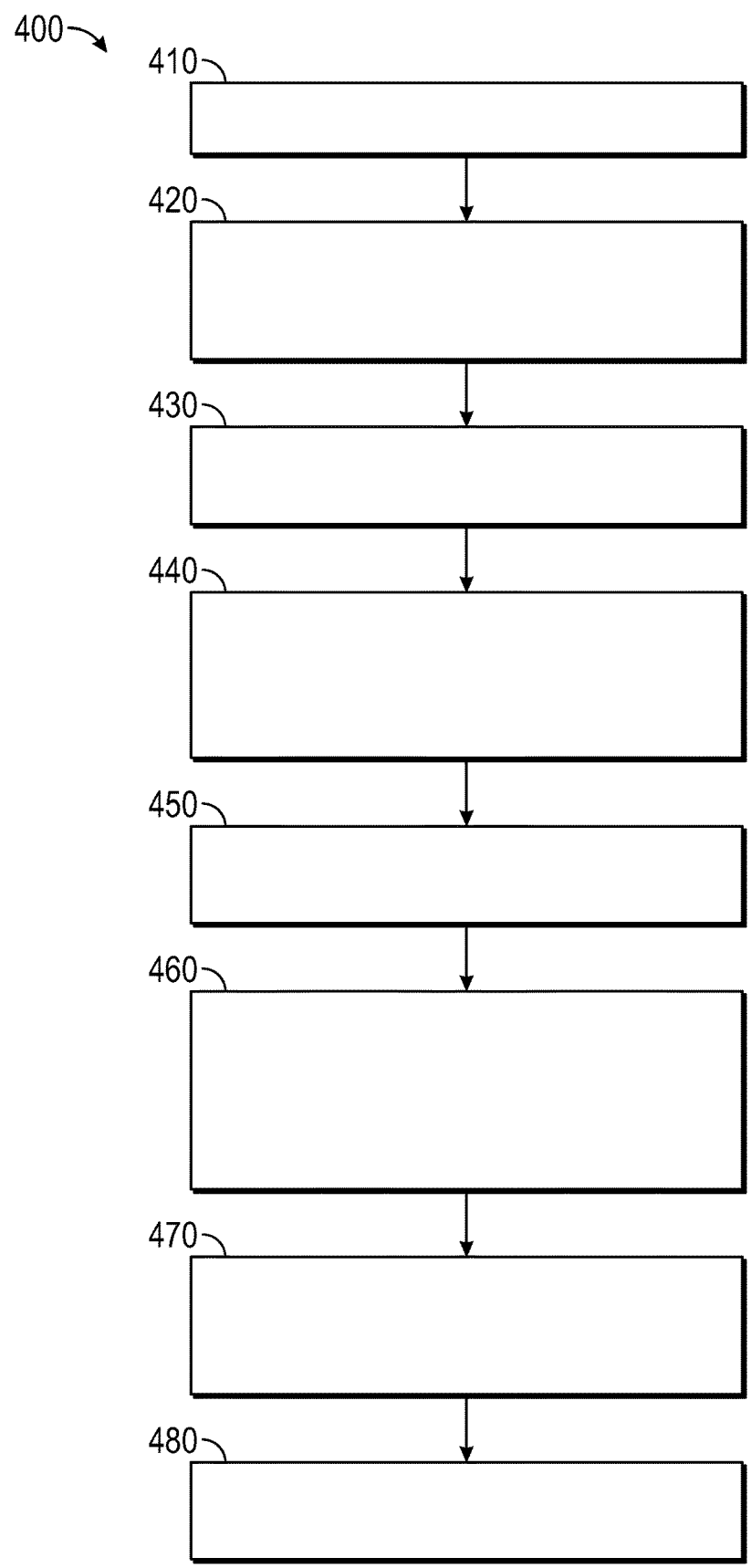
FIG. 4 is a flowchart of a method for implementing traffic sign detection, which can be used in connection with the vehicle of FIG. 1 and the control system of FIG. 2, in accordance with an exemplary embodiment.

FIG. 4 is a flowchart of a method 400 for detecting a 3D position of traffic signs and controlling a feature of the vehicle 100 based thereon. The method 400 can be implemented in connection with the vehicle 100 of FIG. 1 and the control system 102 of FIG. 2, in accordance with an exemplary embodiment. The method 400 may be implemented continuously during vehicle operation.

As depicted in FIG. 4, and with reference to FIG. 3, the method 400 includes the step 410 of receiving the image data from the camera 210. In one embodiment, the image data 304 represents an RGB image from a monocular camera 210. In step 420, the image data 304 is processed through the backbone block 306 and the 2D box block 310 of the neural network 302 to regress the 2D bounding box data 314 representing location and dimensions of one or more traffic signs identified in the image data 304.

In step 430, the azimuth and elevation data 324 is calculated for each 2D bounding box based on the 2D bounding box data 314 and camera intrinsic parameters 320. The azimuth and elevation data 324 can be azimuth and elevation angles or trigonometric functions thereof. The pooling layer 316 is used to extract one or more feature patches from the feature maps of the feature map data 312 regressed from the backbone block 306 corresponding to each 2D bounding box. The features in the one or more feature patches are concatenated with the azimuth and elevation data 324 in the concatenation block 318.

In step 440, a rotation block 326 is used to regress the traffic sign orientation data 336 based on the input concatenation of azimuth and elevation data 324 and the features of the one or more feature patches. The traffic sign orientation data 336 may include global pitch, yaw and roll orientation information or just yaw information or just yaw and pitch information. The traffic sign class block 328 regresses a particular class of traffic sign from numerous (e.g. 10 s or 100 s) possible traffic sign classes to provide traffic sign class data 334.

In step 450, traffic sign dimensions are retrieved for each identified traffic sign based on the traffic sign class data 334 and by looking up the traffic sign dimensions in the traffic sign information database 330. In one embodiment, both road type data 342 and traffic sign class data 334 are to look up a single vector (including width and height) of dimensions for each identified traffic sign, where the traffic sign information database 330 may include plural entries for different road type/speed limits for each traffic sign class.

In step 460, a Z coordinate for each traffic sign is calculated based on the azimuth and elevation data 324, orientation and dimensions of the traffic sign described by the traffic sign orientation data 336, camera intrinsic parameters 320, the traffic sign dimensions data 332 and the dimensions of the 2D bounding box described by the 2D bounding box data 314. As has been described hereinabove, step 460 involves solving one or more equations that have been derived based on a projection of the real world dimensions and orientation of the traffic sign into an image plane of the camera using the azimuth and elevation angles and by constraining the projection to the dimensions of the 2D bounding box.

In step 470, the X and Y coordinates for each traffic sign can be calculated based on the x and y positions of the 2D bounding box, the Z coordinate from step 460 and based on camera intrinsic parameters 320.

In step 480, the X, Y and Z coordinates for a detected traffic sign are utilized in a vehicle control application, including steering, braking and/or propulsion control in an ADAS or autonomous vehicle control application and/or vehicle localization in a mapping application.

It will be appreciated that the disclosed methods, systems, and vehicles may vary from those depicted in the Figures and described herein. For example, the vehicle 100 and the control system 102 and/or various components thereof may vary from that depicted in FIGS. 1 and 2 and described in connection therewith. In addition, it will be appreciated that certain steps of the method 400 may vary from those depicted in FIG. 4 and/or described above in connection therewith. It will similarly be appreciated that certain steps of the method described above may occur simultaneously or in a different order than that depicted in FIG. 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of detecting a three-dimensional position of a traffic sign and controlling a feature of a vehicle based on the three-dimensional position of the traffic sign, the method comprising:
   receiving, via at least one processor, an image from a camera;
   processing the image using a neural network, wherein the neural network includes a traffic sign class block regressing a traffic sign class for a traffic sign included in the image and a rotation block regressing an orientation for the traffic sign, wherein the neural network regresses location and dimensions of a two-dimensional (2D) bounding box around the traffic sign in image coordinates;
   calculating azimuth and elevation angle data, for functions thereof, via the at least one processor, based on the location of the 2D bounding box;
   retrieving, via the at least one processor and from a traffic sign information database, dimensions for the traffic sign based on the traffic sign class;
   solving for Z, via the at least one processor, one or more equations based on position and dimensions of the 2D bounding box, the orientation and dimensions of the traffic sign, the azimuth and elevation angle data, or functions thereof, and intrinsic parameters of the camera, wherein Z is a forward distance from the camera to the traffic sign in camera coordinates;
   determining, via the at least one processor, a three-dimensional (3D) position of the traffic sign based on the location of the 2D bounding box and Z; and
   controlling, via the at least one processor, at least one feature of the vehicle based on the 3D position of the traffic sign.

2. The method of claim 1, wherein the neural network comprises backbone and 2D box blocks that regress the location and dimensions of the two dimensional (2D) bounding box around the traffic sign.

3. The method of claim 2, wherein the neural network comprises a pooling layer that pools features from a feature map output from the backbone block based on the location and dimensions 2D bounding box.

4. The method of claim 3, comprising calculating, via the at least one processor, the azimuth and elevation angle data, or functions thereof, for the traffic sign based on the location of the 2D bounding box in image coordinates and the intrinsic parameters of the camera and concatenating the azimuth and elevation angle data with the pooled features for input to the rotation block.

5. The method of claim 2, comprising calculating, via the at least one processor, the azimuth and elevation angle data, or functions thereof, for the traffic sign based on the location of the 2D bounding box in image coordinates and the intrinsic parameters of the camera for use by the rotation block in regressing the orientation for the traffic sign.

6. The method of claim 1, wherein the one or more equations define a camera projection onto a camera image plane based on the orientation and dimensions of the traffic sign and the azimuth and elevation angle data, wherein the one or more equations constrain a projected 2D bounding box to be consistent with the 2D bounding box regressed by the neural network.

7. The method of claim 1, comprising solving X and Y positions of the traffic sign based on a camera model, the location and dimensions of the 2D bounding box, the camera intrinsic parameters and Z, wherein X, Y and Z make up the 3D position of the traffic sign in camera coordinates.

8. The method of claim 1, wherein the camera is a monocular camera.

9. The method of claim 1, wherein the regressed orientation for the traffic sign is a global orientation and not an allocentric orientation.

10. The method of claim 1, wherein the traffic sign class block is a classifier.

11. The method of claim 1, comprising detecting, via the at least one processor, contextual data for the traffic sign and retrieving dimensions for the traffic sign based on the traffic sign class and the contextual data.

12. The method of claim 11, wherein the contextual data is detected based on mapping information or computer vision processing.

13. The method of claim 11, wherein the contextual data is road type or speed limit data.

14. The method of claim 1, wherein controlling at least one feature of the vehicle comprises controlling an autonomous driving system, localizing the vehicle in a map, or controlling an advanced driver assistance system feature.

15. A vehicle, comprising:
a camera;
at least one processor in operable communication with the camera, the at least one processor configured to execute program instructions, wherein the program instructions are configured to cause the at least one processor to:
receive an image from a camera;
process the image using a neural network, wherein the neural network includes a traffic sign class block regressing a traffic sign class for a traffic sign included in the image and a rotation block regressing an orientation for the traffic sign, the neural network regresses location and dimensions of a two-dimensional (2D) bounding box around the traffic sign in image coordinates;
calculate azimuth and elevation angle data, or functions thereof, based on the location of the 2D bounding box;
retrieve, from a traffic sign information database, dimensions for the traffic sign based on the traffic sign class;
solve for Z one or more equations based on position and dimensions of the 2D bounding box, the orientation and dimensions of the traffic sign, the azimuth and elevation angle data, or functions thereof, and intrinsic parameters of the camera, wherein Z is a forward distance from the camera to the traffic sign in camera coordinates;
determine a three-dimensional (3D) position of the traffic sign based on the location of the 2D bounding box and Z; and
control at least one feature of the vehicle based on the 3D position of the traffic sign.

16. The vehicle of claim 15, wherein the neural network comprises backbone and 2D box blocks that regress the location and dimensions of the two dimensional (2D) bounding box around the traffic sign.

17. The vehicle of claim 16, wherein the program instructions are configured to cause the at least one processor to:
calculate the azimuth and elevation angle data, or functions thereof, for the traffic sign based on the location of the 2D bounding box in image coordinates and the intrinsic parameters of the camera for use by the rotation block in regressing the orientation for the traffic sign.

18. The vehicle of claim 15, wherein controlling at least one feature of the vehicle comprises controlling an autonomous driving system, localizing the vehicle in a map, or controlling an advanced driver assistance system feature.

* * * * *